(12) United States Patent
Norman

(10) Patent No.: US 11,499,662 B2
(45) Date of Patent: Nov. 15, 2022

(54) DEVICE AND METHOD FOR TAPPING WATER MAINS

(71) Applicant: Utility Supply Corporation, Kitchener (CA)

(72) Inventor: Jamie Jerry Norman, Mount Hope (CA)

(73) Assignee: Utility Supply Corporation, Kitchener (CA)

( * ) Notice: Subject to any disclaimer, the term of this patent is extended or adjusted under 35 U.S.C. 154(b) by 0 days.

(21) Appl. No.: 17/124,647

(22) Filed: Dec. 17, 2020

(65) Prior Publication Data

US 2022/0196195 A1    Jun. 23, 2022

(51) Int. Cl.
*F16L 41/04*    (2006.01)

(52) U.S. Cl.
CPC .................................... *F16L 41/04* (2013.01)

(58) Field of Classification Search
CPC ....................................................... F16L 41/04
See application file for complete search history.

(56) References Cited

U.S. PATENT DOCUMENTS

| | | | | |
|---|---|---|---|---|
| 3,252,475 A * | 5/1966 | Jones | ..................... | F16L 41/065 408/97 |
| 3,734,112 A * | 5/1973 | Finney | ..................... | F16L 41/06 137/15.13 |
| 4,140,155 A * | 2/1979 | Tannery | ................ | F16L 41/065 285/197 |
| 4,789,189 A * | 12/1988 | Robertson | ............... | F16L 41/06 285/373 |
| 5,577,529 A | 11/1996 | Katz | | |
| 5,732,732 A | 3/1998 | Gross | | |
| 5,906,048 A * | 5/1999 | Bender | ................... | F16L 41/06 137/5 |
| 9,200,740 B2 * | 12/2015 | Leto | ........................ | F16L 15/08 |

* cited by examiner

*Primary Examiner* — Kevin R Barss
(74) *Attorney, Agent, or Firm* — Barlow, Josephs & Holmes, Ltd.; Stephen J. Holmes

(57) ABSTRACT

A tapper for tapping a water main is disclosed. The tapper includes a tapping portion having an open first end for coupling to a saddle fitted on a water main. The tapping portion defines a first interior space to be fluidly connected to the water main. A coupling portion extends from the tapping portion and has a receiving end for receiving a service line. The coupling portion has a second interior space fluidly connecting the first interior space and the receiving end. A cutter is arranged in the first interior space. The cutter is advanceable from a starting position to a tapping position at the first end and retractable to the starting position. Related methods are also disclosed.

16 Claims, 15 Drawing Sheets

DEVICE AND METHOD FOR TAPPING WATER MAINS

FIELD

This application relates generally to devices and methods for tapping water mains and, more particularly, to devices and methods for both tapping a water main and connecting a service line to the water main.

BACKGROUND

Connecting a service line to a water main involves first tapping the main. Doing so while the main is under pressure is known as "hot" tapping. Referring to FIG. 1, typically, hot tapping of a municipal water main involves fitting a saddle 10 to the water main, installing a valve 12 on the saddle and then using a tapping device (not shown) connected to the outlet 14 of the valve 12 to tap the water main. The tapping device cuts an aperture into the water main, sometimes removing a circular portion of the water main, known as the coupon. Before the tapping device is removed from the valve outlet 14, the valve 12 is shut. A service line is then connected to the outlet 14 of the valve 12. The valve 12 is opened as desired to pressurize the service line.

It may be desirable to simplify the process of hot tapping a water main and connecting the service line.

SUMMARY

According to one aspect of the present disclosure, there is provided a tapper for tapping a water main, the tapper comprising: a tapping portion having an open first end for coupling to a saddle fitted on a water main, the tapping portion defining a first interior space to be fluidly connected to the water main; a coupling portion extending from the tapping portion and having a receiving end for receiving a service line, the coupling portion having a second interior space fluidly connecting the first interior space and the receiving end; and a cutter arranged in the first interior space, the cutter being advanceable from a starting position to a tapping position at the first end and retractable to the starting position.

According to another aspect of the present disclosure, there is provided a method for connecting a service line to a water main fitted with a saddle, the method comprising: coupling a tapper to the saddle, the tapper having a tapping portion for coupling to the saddle and a coupling portion for receiving the service line; inserting the service line into the coupling portion; advancing a cutter arranged in the tapping portion until a tapping position such that an aperture is cut in the water main; and retracting the cutter to a starting position.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, there is shown in the drawings illustrative embodiments of the disclosure. It should be understood, however, that the application is not limited to the precise arrangements and instrumentalities shown. In the drawings.

DETAILED DESCRIPTION

Figure 1:
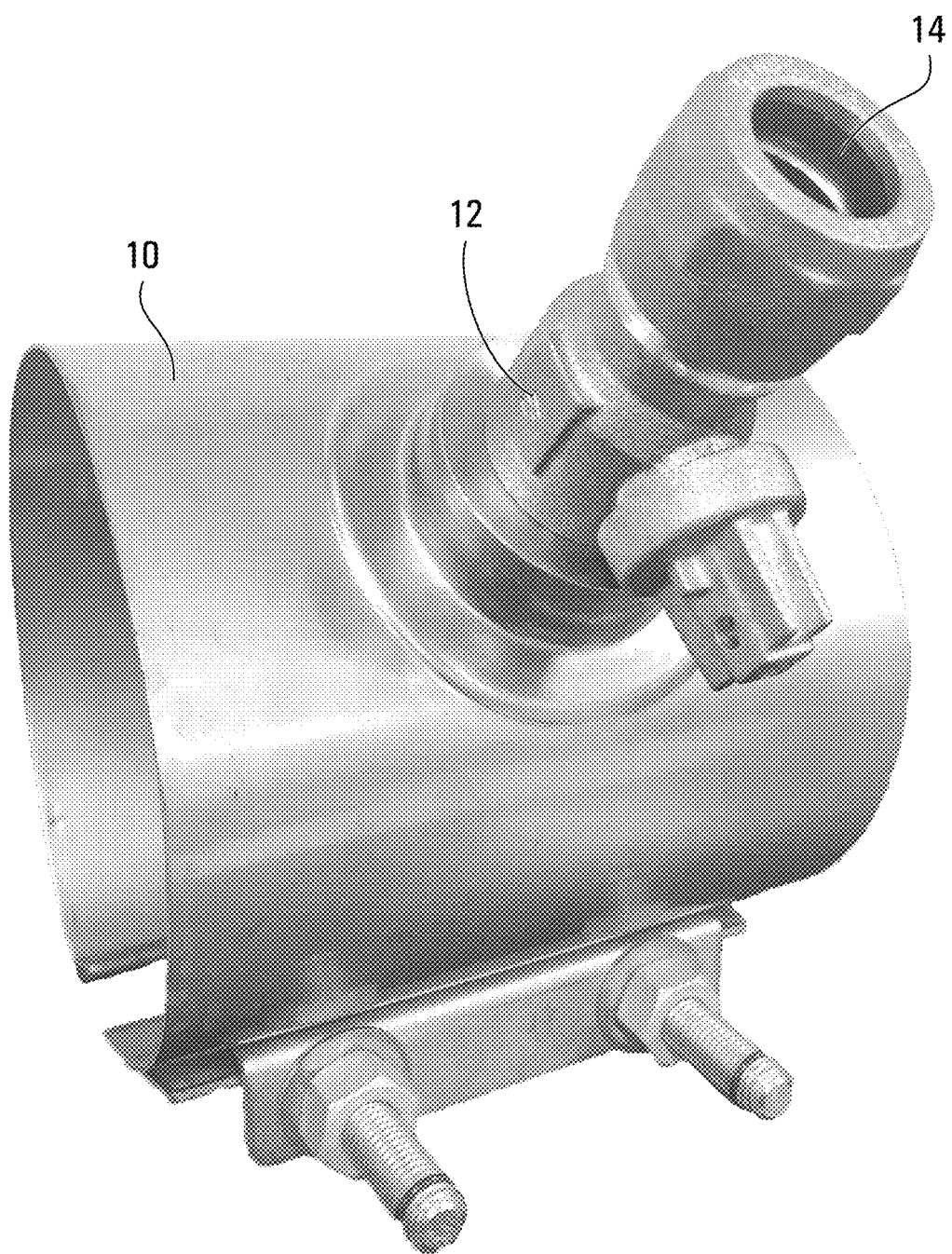
FIG. 1 shows a saddle with a prior art main stop valve installed.
Figure 2:
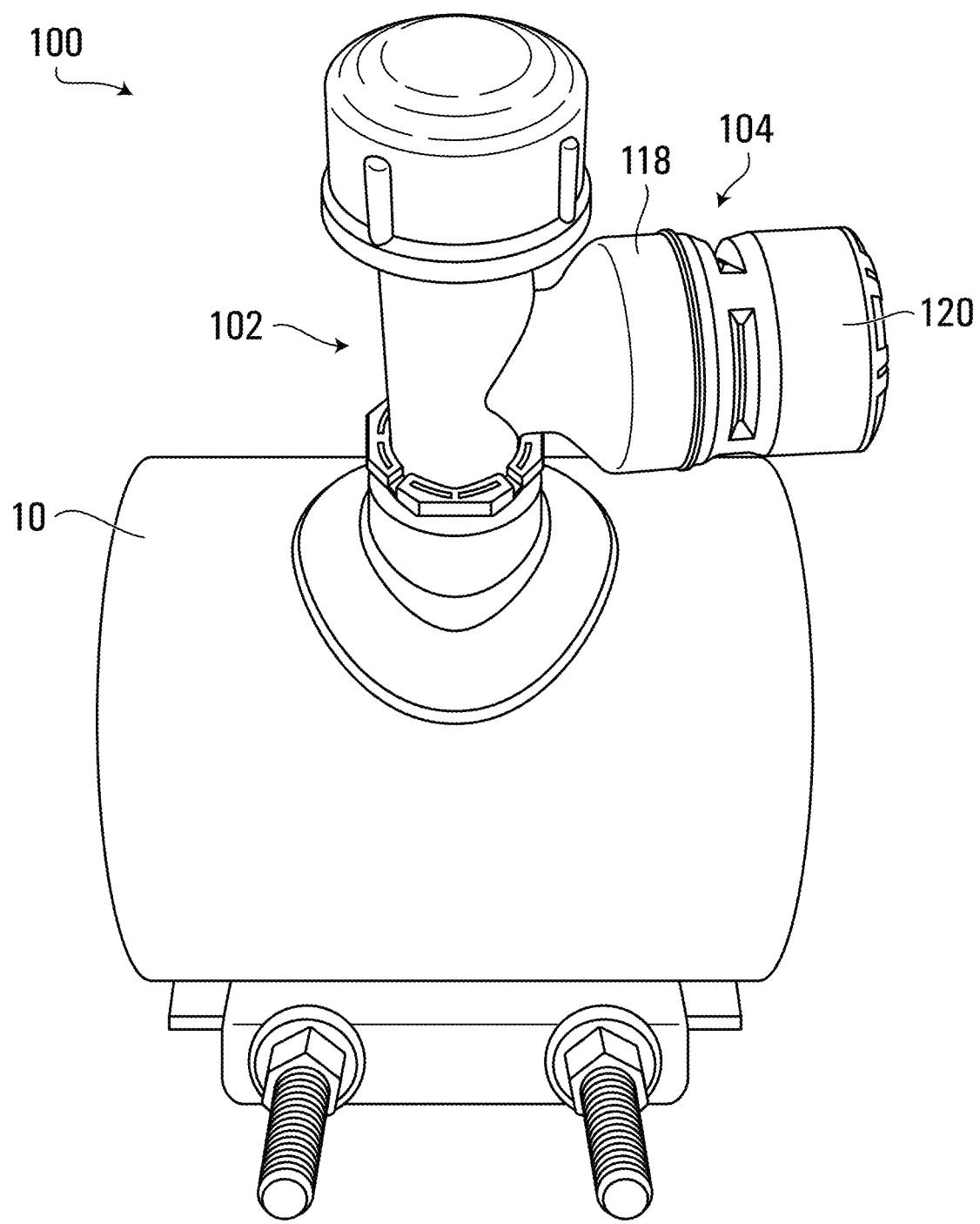
FIG. 2 shows a saddle with a tapper according to embodiments of the present disclosure installed.
Figure 3:
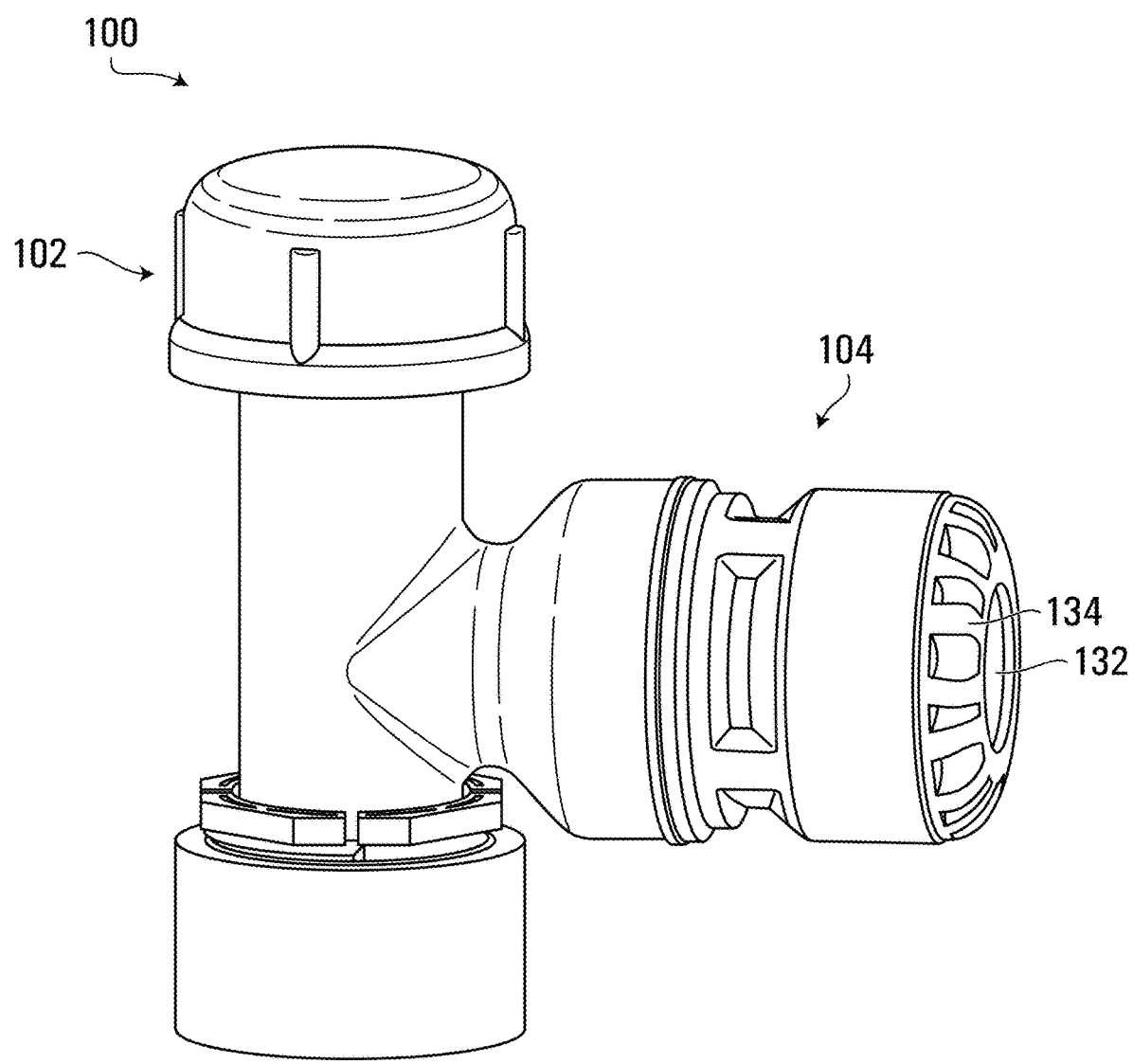
FIG. 3 shows a tapper according to embodiments of the present disclosure.
Figure 4:
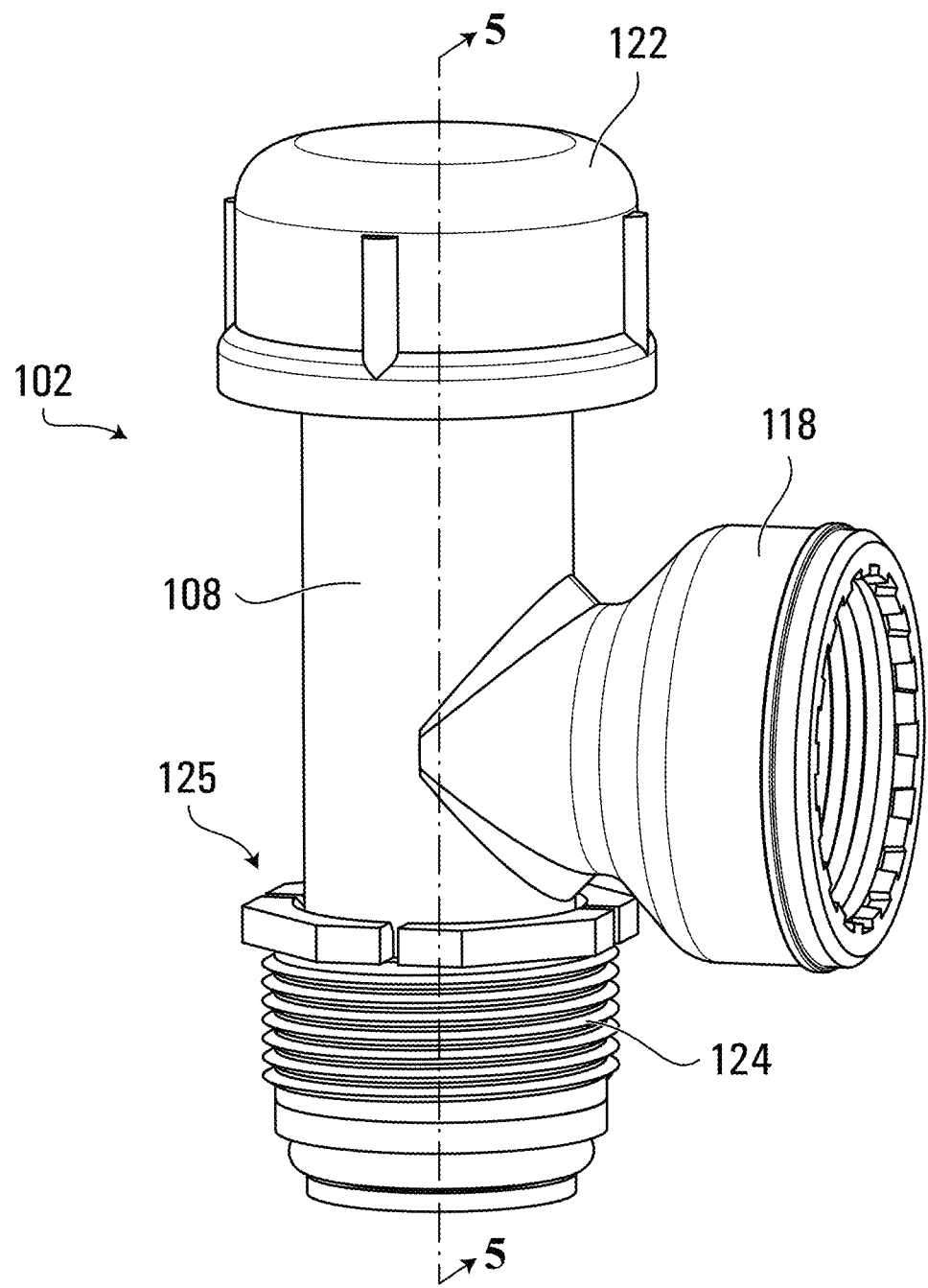
FIG. 4 shows a part of the tapper of FIG. 3.

The present disclosure relates to embodiments for a tapper and related methods. According to the present disclosure, embodiments of a tapper are provided that combine a tapping portion for tapping a water main and a coupling portion for connecting a service line so that a water main may be tapped and a service line connected without removing the tapper. Following tapping, the tapper may act as a main stop with the service line connected. A tapper according to the present disclosure may be used in hot tapping the water main and may provide an advantage over existing devices and methods since fewer separate devices are required, the hot tapping process is simplified and the tapper may be substantially made of materials considered durable but less expensive than existing brass couplings and fixtures.

Embodiments of a tapper according to the present disclosure will now be described. The tapper 100 includes a tapping portion 102 and a coupling portion 104 extending from the tapping portion 102 for coupling and receiving a service line (not shown). The tapping portion 102 has a generally cylindrical body 108 with a wall 110 defining a first interior space 112, with an interior threaded surface 113. The first interior space 112 has a first open end 114 and a second open end 116, opposite the first end 114. The coupling portion 104 extends generally perpendicularly from the tapping portion 102 and is comprised of a branching portion 118 connected to the body 108 and an attachable receiving portion 120.

Removable cap 122 is threadingly coupled to and covers the second end 116. A threaded nut 124 is arranged rotatably with respect to the body 108 proximate the first end 114. The threaded nut 124 is installable on the body 108 due to a vertical slit 125, which allows for flexing and installation on the body 108. After installation, the threaded nut 124 rests and abuts against annular ledge 127 and is rotatable with respect to the body 108. The threaded nut 124 is used to install the tapper 100 on a saddle, such as the saddle 10.

Following installation, the tapper 100 remains rotatable with respect to the saddle 10, allowing for rotation of the tapper 100 to accommodate desired directions of the service line.

An O-ring 126 is arranged adjacent the first end 114 in a groove 129 for sealing engagement with the saddle 10. A second O-ring 128 is arranged adjacent the second opening 116 for sealing engagement with the cap 122.

The coupling portion 104 includes a second interior space 130 that fluidly connects to the first interior space 112 and a receiving opening 132 at a receiving end 134 of the coupling portion 104. The second interior space 130 fluidly connects with the first interior space 112 generally at a branching position 136.

A cutter 138 is arranged within the first interior space 112. The cutter 138 includes a generally cylindrical cutter body 140 and three blades 142 extending generally downwards from the cutter body 140. The blades 142 are curved along a common circumference and define a generally cylindrical cutting void 143.

Thread 144 on an exterior of the cutter body mates with thread 146 on the interior threaded surface 113 of the wall 110. A top extension 150 extends from the top of cutter body 140 and has a lesser diameter than the cutter body 140. A groove 154 receives O-ring 152, which forms a seal with an annular outcropping 156 of the wall 110.

A hexagonal socket 158 extending into the top extension 150 allows for insertion of a tool to rotate, such as a hex driver, and screw the cutter 138. It will be understood that other socket types for driving the cutter are possible. Moreover, in some embodiments, rather than a socket, the cutter may be provided with a nut that extends from a top of the cutter body.

In some embodiments, the cutter may be operably connected to a rotating cap, nut, sleeve or other component that permits manipulation of the cutter in order to advance or retract it instead of or in addition to use of an external tool.

Figure 5:
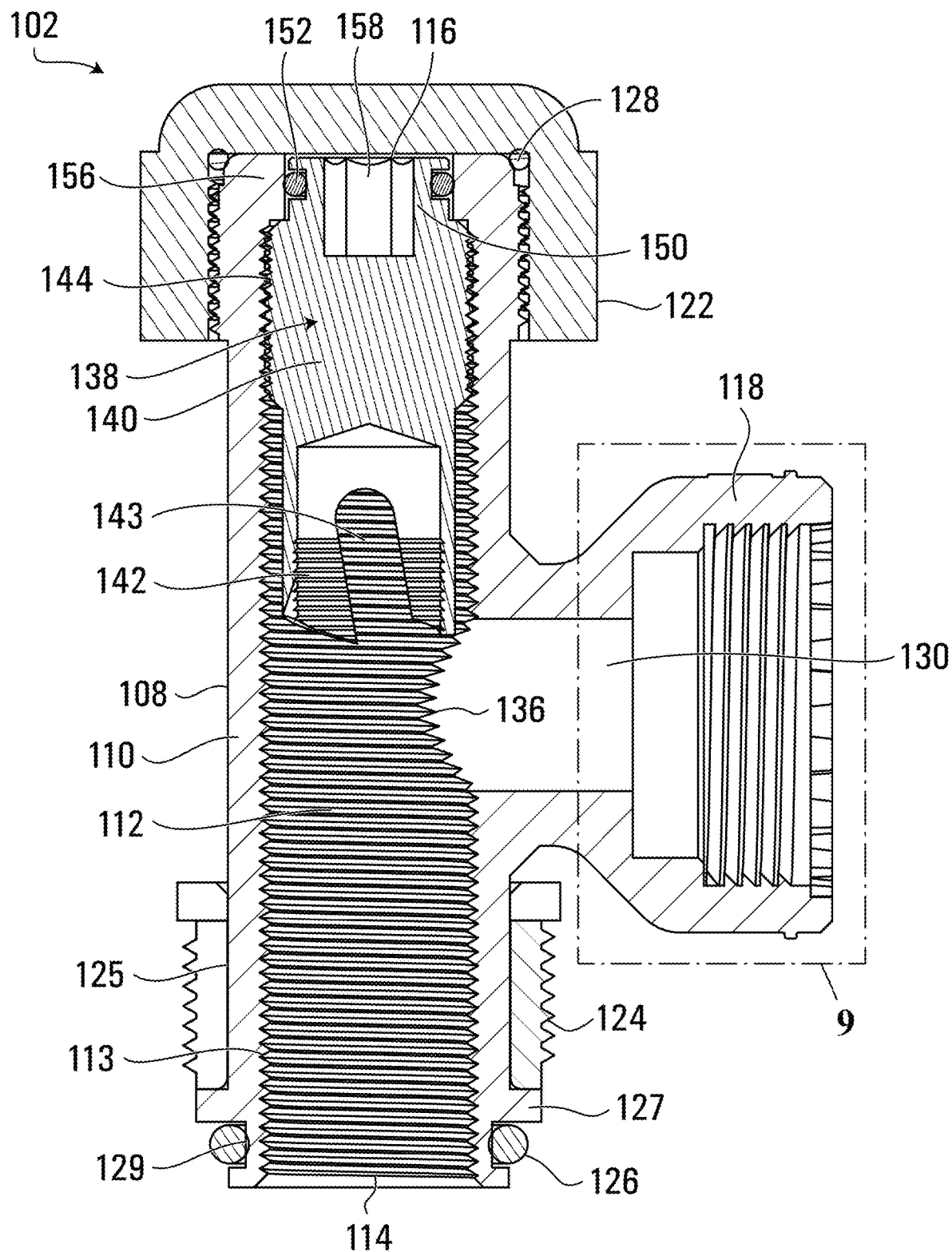
FIG. 5 shows a cross-section of the part of FIG. 4 taken along line 5-5.
Figure 6:
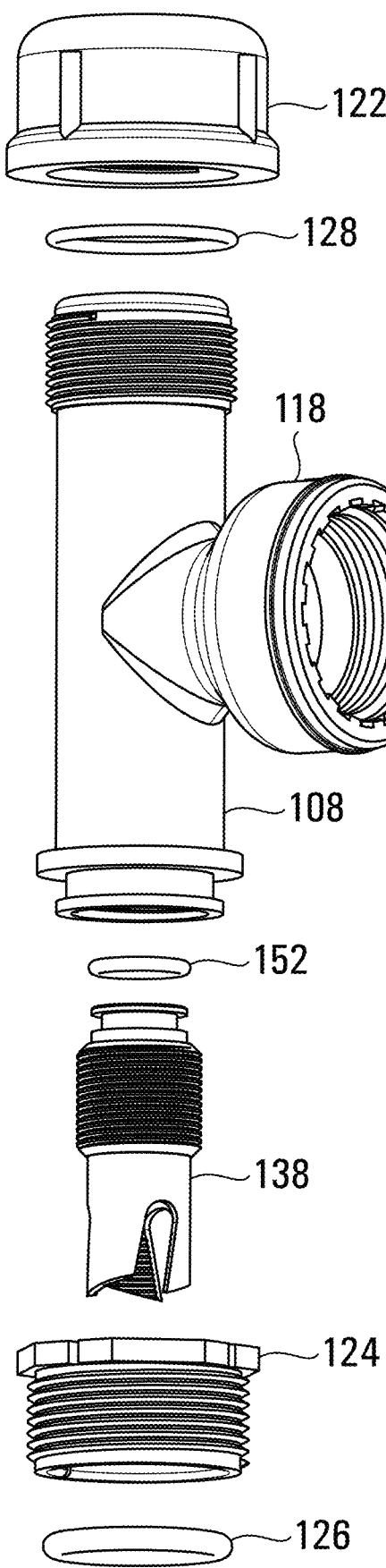
FIG. 6 shows an exploded view of the part of FIG. 4.
Figure 7:
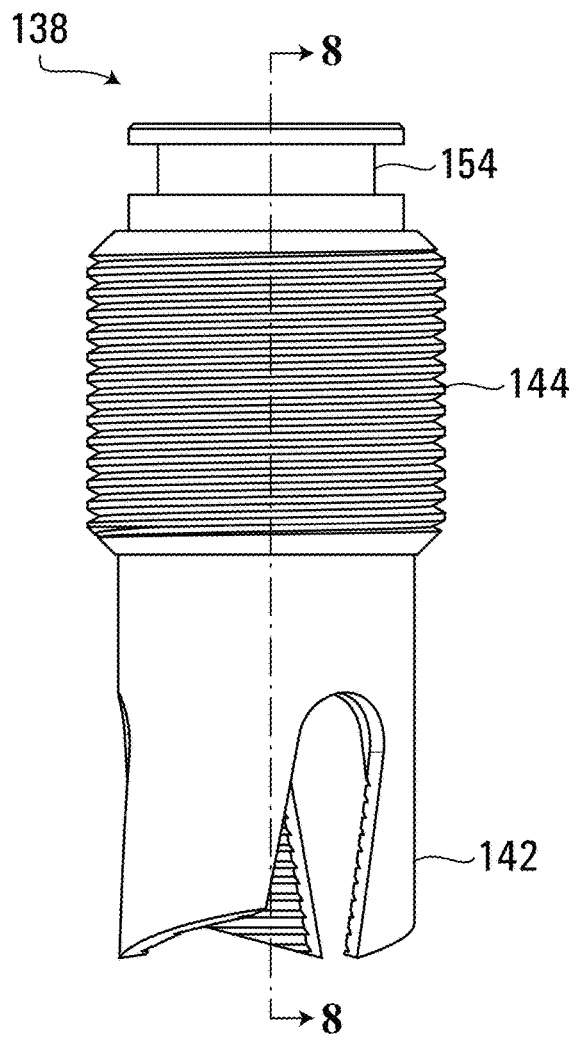
FIG. 7 shows a cutter of the tapper according to embodiments of the present disclosure.
Figure 8:
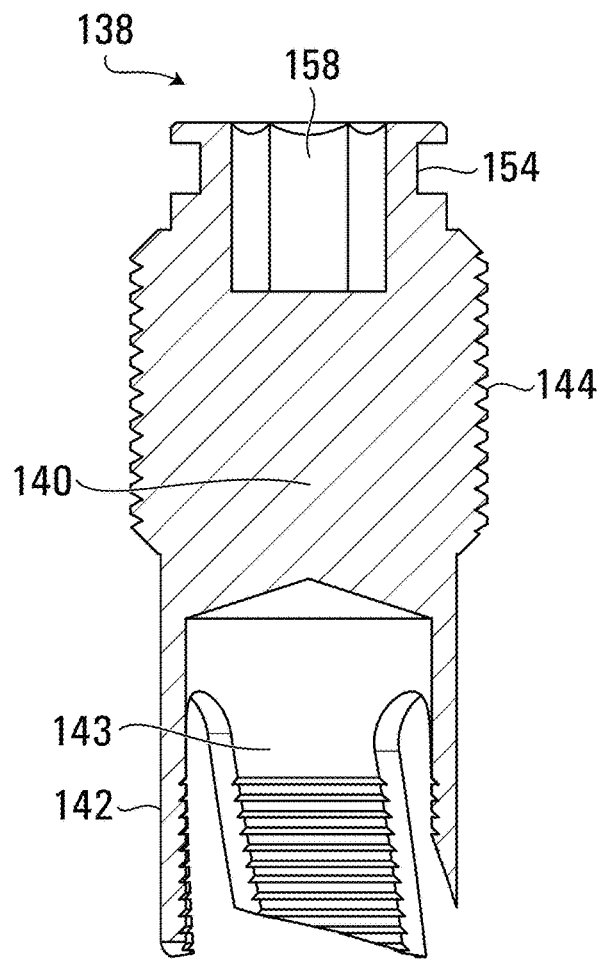
FIG. 8 shows a cross-section of the cutter taken along line 8-8.

As seen in FIG. 5, the cutter 138 is shown in a starting position proximate the second end 116. The starting position is further from first end 114 than the branching position 136 such that the cutter, in the starting position, does not obstruct the fluid communication between the first and second interior spaces 112 and 130. By screwing the cutter 138 clockwise, for example by insertion of a hex driver into the socket 158, the cutter 138 may be advanced along the interior space 112 until the blades 142 protrude from the first opening 114 and cut into the water main. In so doing, the blades 142 cut a generally circular coupon from the water main, which becomes lodged within the cutting void 143. By unscrewing the cutter 138, the cutter 138 is retractable to the starting position, retaining the coupon. Water in the main is then clear to flow into the coupling portion 104. In this manner, the cutter 138 may also act as a valve to control the follow flow of water into the coupling portion 104.

Figure 9:
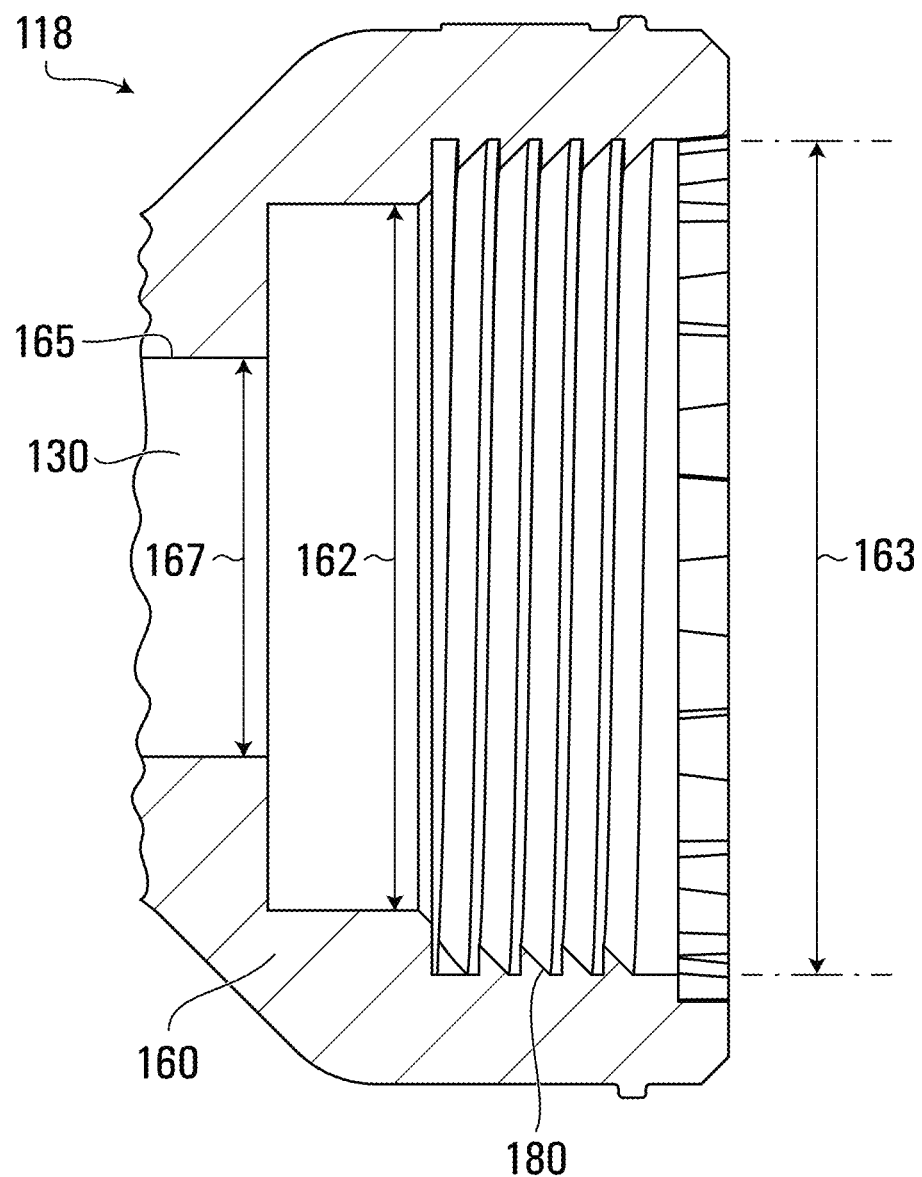
FIG. 9 shows an enlarged view of area 9 identified in FIG. 5.
Figure 10:
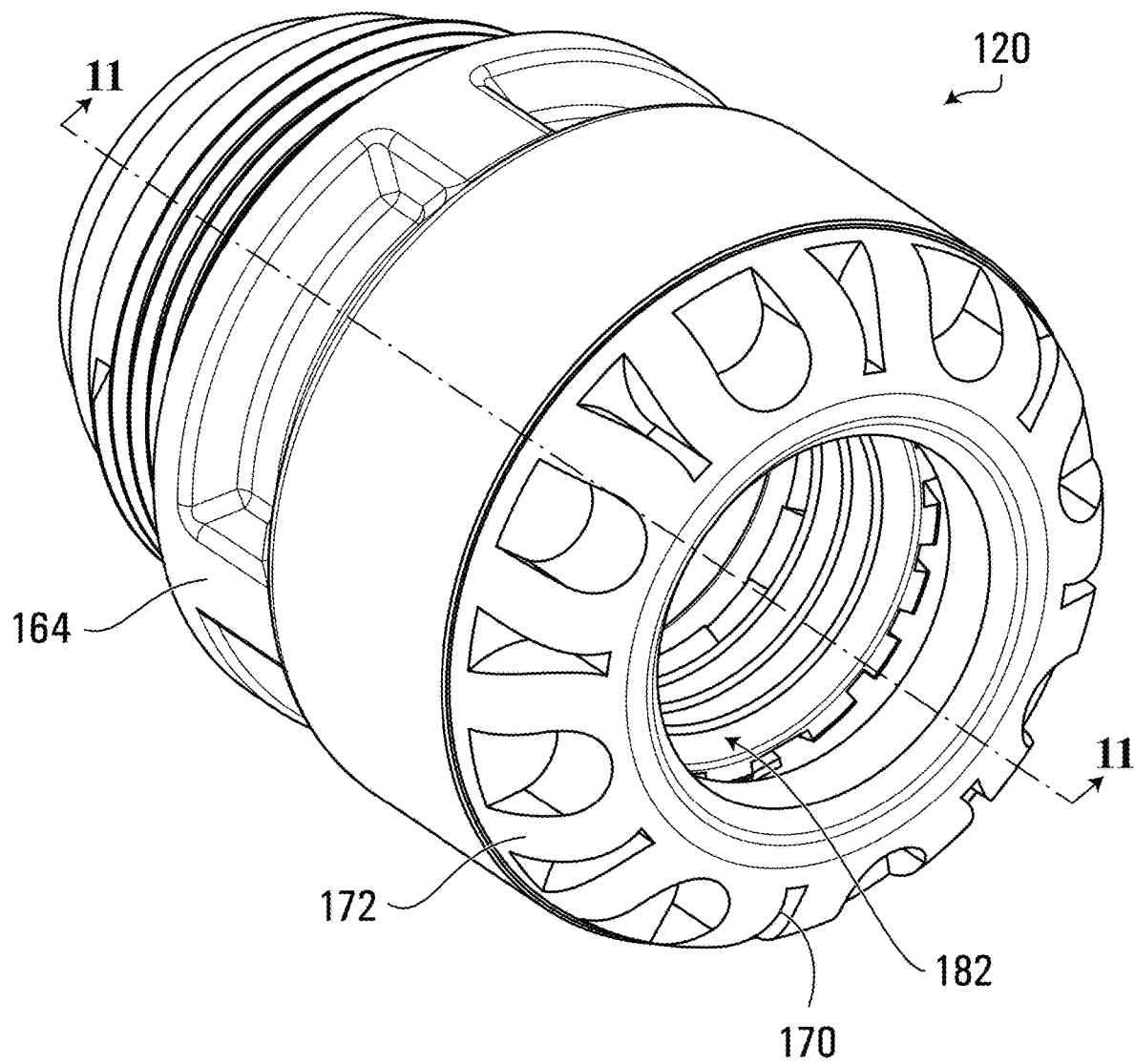
FIG. 10 shows a receiving portion of the tapper according to one embodiment of the present disclosure.
Figure 11:
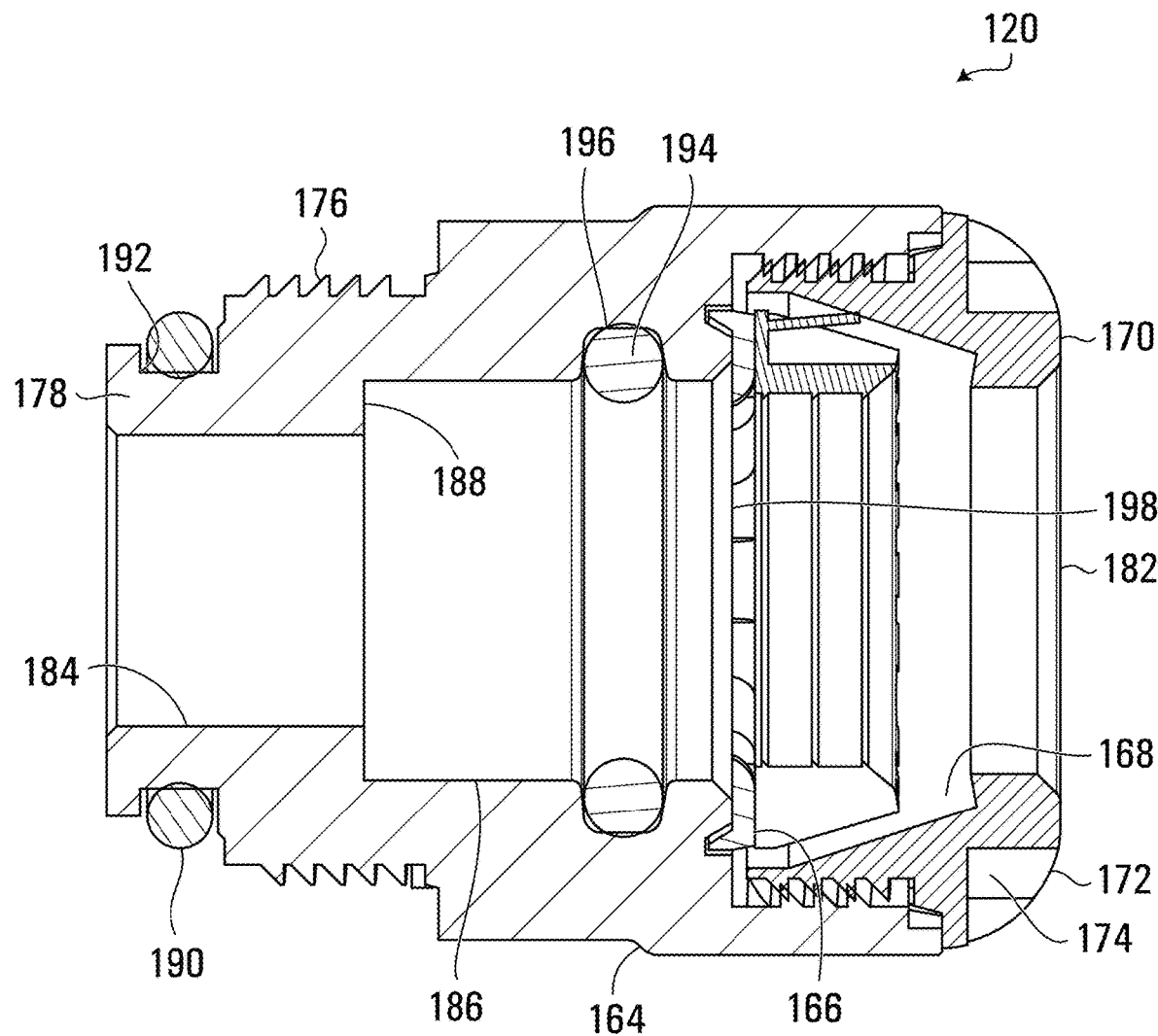
FIG. 11 shows a cross-section of the receiving portion taken along line 11-11.

Referring to FIGS. 9-11, the branching portion 118 and receiving portion 120 will be described in further detail. In the illustrated embodiment, the branching portion 118 includes wall 160 defining first interior diameter 162 and a second, threaded interior diameter 163 larger than the first interior diameter 162. Both the first and second interior diameters 162, 163 define part of the second interior space 130 that also includes cylindrical bore 165, which extends to the first interior space 112. The cylindrical bore 165 has a diameter 167 smaller than the first interior diameter 162.

The receiving portion 120 includes a receiving portion body 164 and an annular restrainer 166 sandwiched between the body 164 and an annular, frustoconically shaped gripper 168. The gripper 168 acts to engage an interior of a nut 170 threaded into the body 164 to reduce or prevent relative motion between the nut 170 and the body 164. Outer, rounded surface 172 of the nut 170 includes depressions 174 providing a grippable surface to more easily manipulate the nut 170 and, thereby, the receiving portion 120. Thread 176, adjacent a tail end 178 of the body 164 opposite the nut 170, mates with thread 180 on the second interior diameter 163 of the branching portion 118 for coupling the receiving portion 120 to the branching portion 118. The nut 170 includes receiving opening 182.

The body 164 includes first internal bore 184 and second internal bore 186. The first internal bore 184 has a smaller diameter than the second internal bore 186, resulting in annular ledge 188. Apertures within the restrainer 166, the gripper 168, and the nut 170, are generally of the same diameter as the diameter of the second internal bore 186. The diameter of the second internal bore 186 is generally sized to match an exterior diameter of the service line being inserted into the receiving portion 120.

O-ring 190 is positioned in a groove 192 proximate to and on an exterior of the tail end 178 to form a seal with the first interior diameter 162.

O-ring 194 is positioned in an annular groove 196 on an interior of the body 164 within the second internal bore 186 for forming a seal with the service line inserted into the receiving portion 120. The O-ring 194 is sized to annularly protrude into the second internal bore 186 to ensure a proper seal.

The restrainer 166 includes teeth 198 extending radially from the restrainer 166 into the second interior space 130. The teeth 198 are angled away from the receiving opening 182. The diameter defined between the teeth 198 is less than the diameter of the second internal bore 186, thus resulting in a positive interference between the teeth 198 and the external surface of the service line when inserted. This interference, together with the angling of the teeth 198 aids in preventing the service line from being forced backwards out of the receiving portion 120, for example due to water pressure in the line and the flow of water coming from the water main.

More generally, after the receiving portion 120 has been coupled to the branching portion 118, in operation, the service line is inserted into the receiving portion 120 through the receiving opening 182 until at least past the restrainer 166, but preferably until the service line contacts the ledge 188. The diameter of the first internal bore 184 generally matches the internal diameter of the service line, thus providing a generally unobstructed fluid communication between the two.

Figure 12:
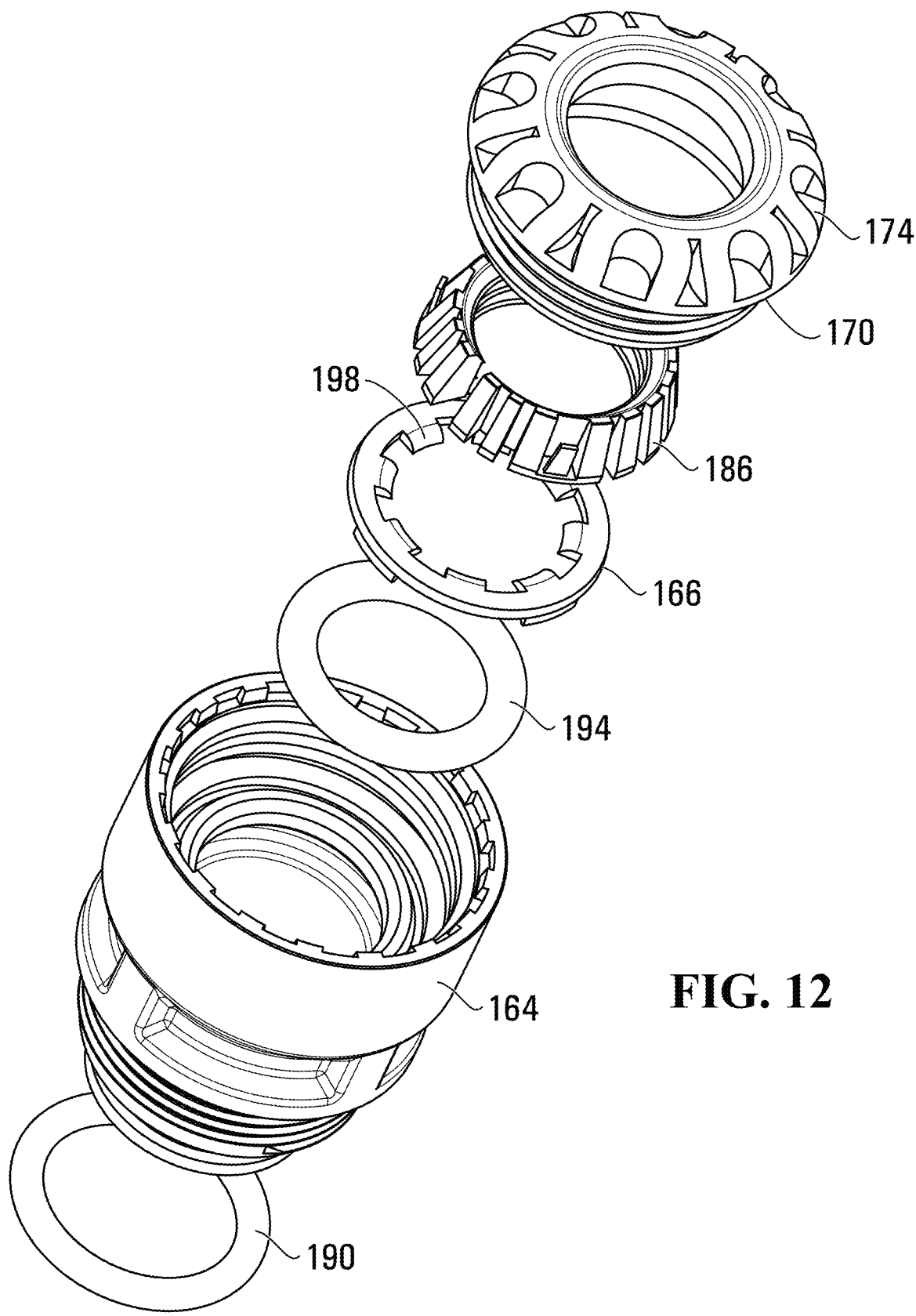
FIG. 12 shows an exploded view of the receiving portion of FIG. 10.

In the illustrated embodiment of FIGS. 10 to 12, the receiving portion 120 is sized to accommodate a service line having a diameter of 1 inch. More specifically, the diameter of the second internal bore 186 nominally matches that of a 1-inch service line.

Figure 13:
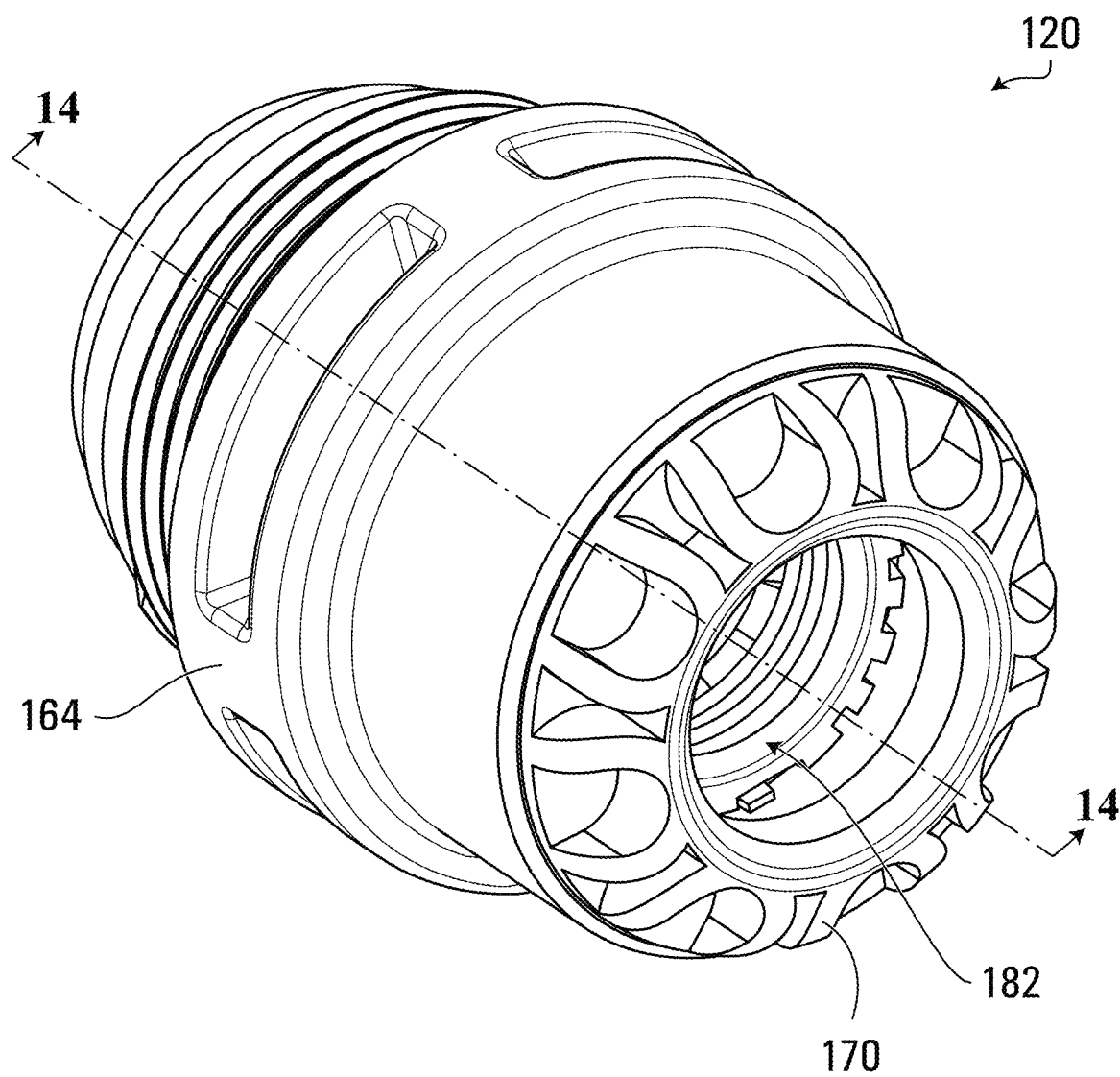
FIG. 13 shows a receiving portion according to another embodiment of the present disclosure.
Figure 14:
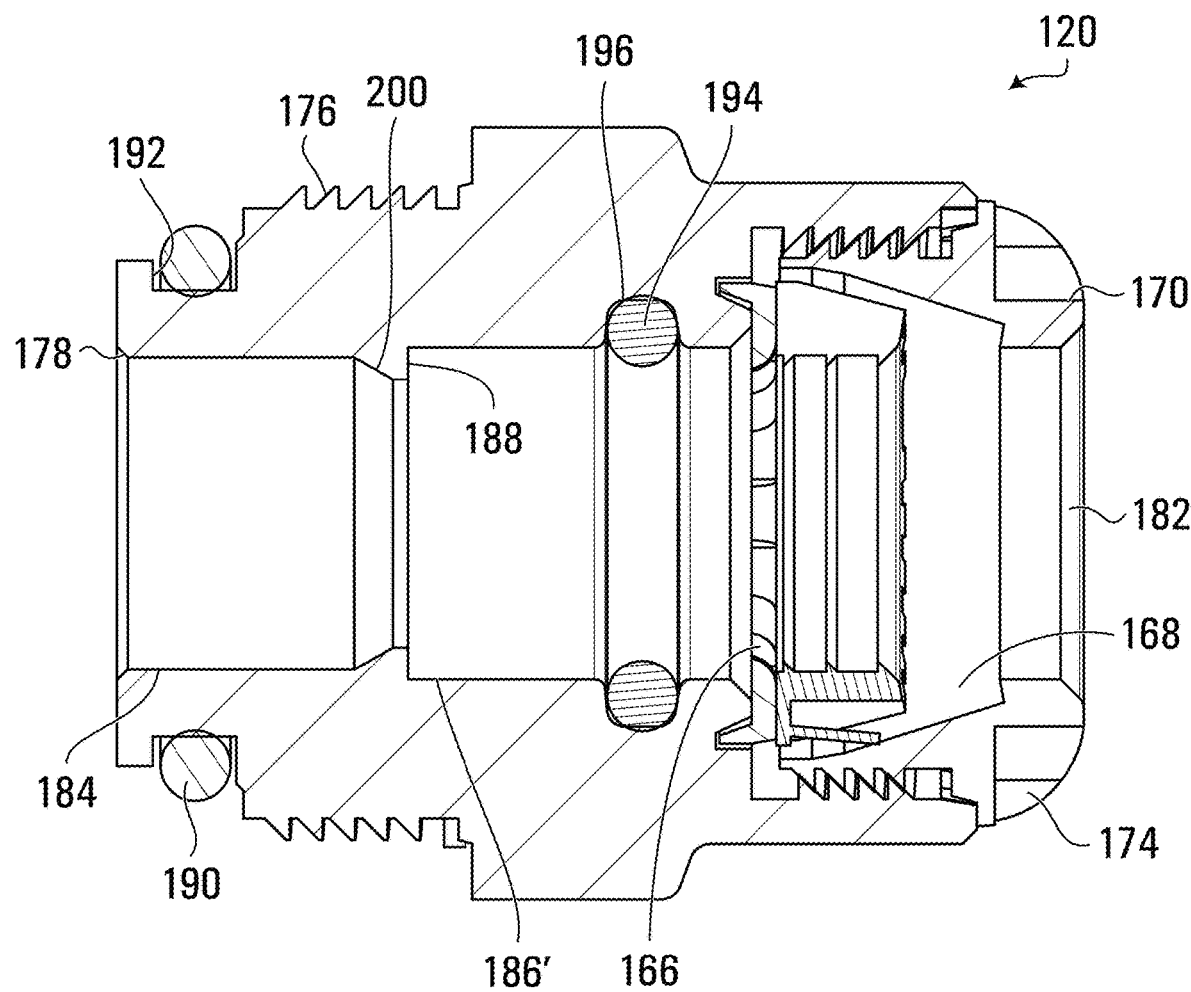
FIG. 14 shows a cross-section of the receiving portion taken along line 14-14.
Figure 15:
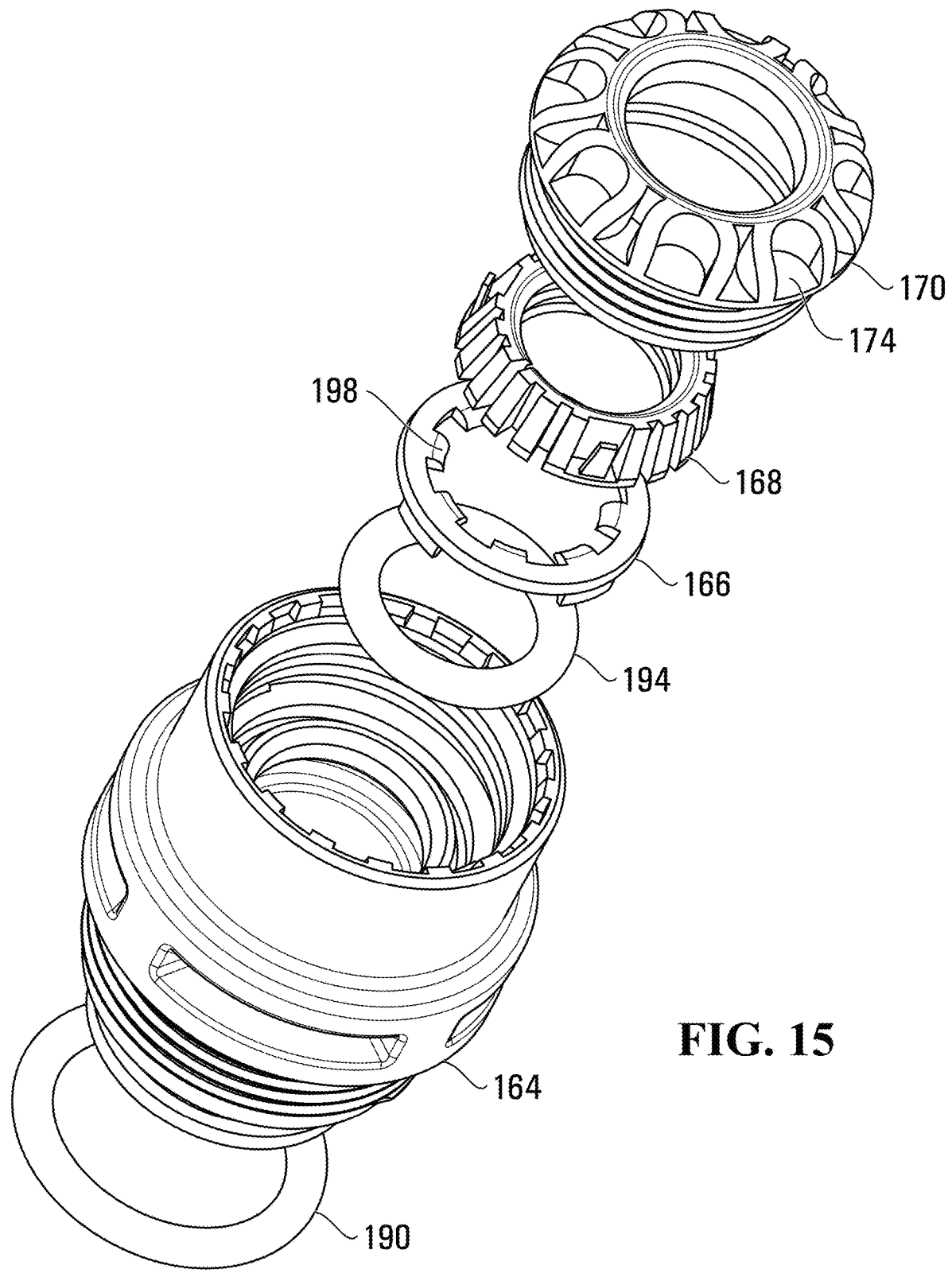
FIG. 15 shows an exploded view of the receiving portion of FIG. 13.

By having the receiving portion 120 attachable and separate from the branching portion 118, a receiving portion may be selected that is specifically sized to accommodate the service line being connected. A further embodiment of the receiving portion 120 is shown in FIGS. 13 to 15. Like components will be referred to with like reference numerals. It will be noted that the components have been resized to accommodate a smaller diameter of the service line. In particular, in this embodiment, the receiving portion 120 is intended to be used with a ¾ inch service line. Specifically, the diameter of the second internal bore 186' is narrower and similar in size to the diameter of the first internal bore 184. A constricted portion 200 is included to provide for a ledge 188 against which the service line will abut in the fully received position. The ledge 188 signals that the service line has been inserted sufficiently, to ensure retention, as well as a proper seal.

It will be understood that other sizes of service lines may be accommodated by modifying the diameters of the receiving portion 120, such as the diameter of the second internal bore 186. Moreover, different materials of service lines may be accommodated, including PE-RT tubing, PB, PP-R, PVC, ABS, PE, PP, PEX, steel and copper, among others. For example, the material selection, configuration, sizing and shape of the restrainer 166 and/or teeth 198 may be modified to accommodate different material selection of the service line to ensure proper retention of the service line.

The tapper 100 may be comprised of a variety of materials or a mix of materials. In some embodiments, the tapper 100 is composed primarily of hard plastic but for the cutter 138, which is made of stainless steel to provide for sharp blades 142 to cut the water main.

Other embodiments than those illustrated are possible. For example, while the illustrated embodiment shows a receiving portion separate from the branching portion, in other embodiments the receiving portion and branching portion may be composed of a single unitary body. Conversely, while the illustrated embodiment shows the branching portion as being unitary with the body of the tapper, in other embodiments the branching portion may be attachable to the body by being coupled via mating threads or other means. More generally, any workable combination of unitary and separable components of the tapping and coupling portions that operate as described herein are within the scope of the present disclosure.

Moreover, while the cutter in the illustrated embodiment is advanced by being screwed, other embodiments are possible where the cutter may be advanced or retracted in other ways, for example along guides.

The present disclosure is not limited to the precise configuration of the portions and components shown in the illustrated embodiment. For example, the branching portion may extend from the body at other locations, with other angles. A tapper according to the present disclosure may also include two or more coupling portions, each branching from the tapping portion and fluidly communicating therewith. This may allow an equal number of service lines to be connected. The multiple branching portions may connect at the same or different positions to the taping portion.

Additional components, such as a valve may also be incorporated into the tapper. For example, a valve may be incorporated into the coupling portion to stop water flow to the service line even if the cutter is fully retracted. In embodiments with multiple coupling portions, each may have a valve incorporated to control flow to each coupling portion individually.

In some embodiments, the tapper may not be installed directly to a saddle but may make use of an intermediate coupling through which the cutter would extend before being retracted. In some embodiments, the tapper may incorporate or be provided with the saddle so that the tapper may be directly fitted to the water main.

Other shapes, sizes, configurations are possible and the present disclosure is not limited to the precise shapes, sizes and configurations shown in the drawings. In some embodiments, a component may be varied or omitted entirely without departing from the scope of the present disclosure. For example, in some embodiments, the restrainer may not be configured as a separate ring but may instead by incorporated directly into the receiving portion. In some embodiments a restrainer may be omitted and the service line may be secured to receiving portion in a different manner.

Figure 16:
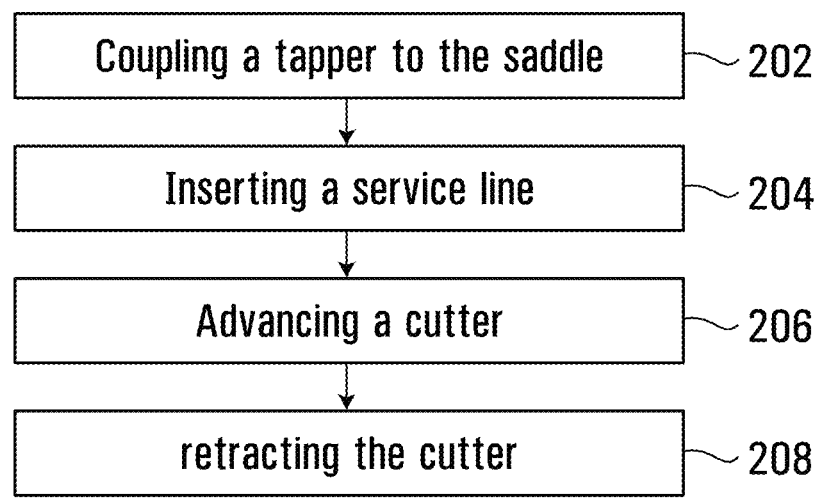
FIG. 16 shows steps of a method according to embodiments of the present disclosure.

The present disclosure also includes all methods related to the operation, use and manufacture of the embodiments of the tapper as described herein. According to some embodiments of the present disclosure, a method for connecting a service line to a water main is disclosed. Referring to FIG. 16, at 202 the method includes the step of coupling a tapper to a saddle fitted to the water main. In some embodiments, the tapper includes a tapping portion for coupling to the saddle and a coupling portion for receiving the service line.

At 204, the method includes the step of inserting a service line into the coupling portion. For example, this may include a user inserting the service line into the receiving portion of the coupling portion of the tapper described above until resistance is met and the service line is firmly in place.

At 206, the method includes advancing a cutter until a tapping position in order to cut an aperture in the water main. For example, this may include advancing the cutter by screwing it downward through the tapper body, as described above.

At 208, the method includes retracting the cutter to a starting position. For example, this may include retracting the cutter by unscrewing it upward through the tapper body, as described above.

It is noted that the steps need not be performed in the order shown in FIG. 16. Specifically, inserting the service line may occur at any time suitable to the user. For example, the service line may be inserted after the cutter has been advanced and before it is retracted or the cutter has been partially retracted but before water is permitted to flow into the coupling portion. The service line may even be inserted before the tapper is coupled to the saddle. For example, in embodiments described above where the tapper body is rotatable with respect to the saddle, the tapper may be installed with the service line already connected.

In some embodiments, methods according to the present disclosure may include one or more of:
  inserting the service line at least until a restrainer arranged within the coupling portion engages the service line.
  selecting a receiving portion sized for the service line and coupling it to a branching portion of the coupling portion.
  advancing the cutter by screwing the cutter towards the water main.
  advancing and retracting the cutter by accessing the cutter from an open end of the tapping portion.
  capping an open end of the tapping portion used to access the cutter.
  rotating the tapping portion with respect to the saddle after coupling the tapper to the saddle.
  advancing the cutter to shut off a flow of water to the service line.

Numerous specific details have been set forth in order to provide a more thorough understanding of the inventive concepts. However, it will be apparent to one of ordinary skill in the art that the inventive concepts within the instant disclosure may be practiced without these specific details. In other instances, well-known features have not been described in detail to avoid unnecessarily complicating the instant disclosure.

As used herein, the terms "comprises," "comprising," "includes," "including," "has," "having" or any other variation thereof, are intended to cover a nonexclusive inclusion. For example, a composition, a process, method, article, or apparatus that comprises a list of elements is not necessarily limited to only those elements but may include other elements not expressly listed or inherently present therein.

As used herein the terms "generally", "approximately," "about," "substantially" and variations thereof are intended to include not only the exact value qualified by the term, but to also include some slight deviations therefrom, such as deviations caused by measuring error, manufacturing tolerances, wear and tear on components or structures, stress exerted on structures, and combinations thereof, for example.

Use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Moreover, it will be understood that features of one embodiment may be combined with features of other embodiments, even if not expressly recited or described as a combination.

The invention claimed is:

1. A tapper for tapping a water main, the tapper comprising:
    a tapping portion having an open first end for coupling to a saddle fitted on a water main, the tapping portion defining a first interior space to be fluidly connected to the water main;
    a coupling portion extending from the tapping portion and having a receiving end for receiving a service line, the coupling portion having a second interior space fluidly connecting the first interior space and the receiving end; and
    a cutter arranged in the first interior space, the cutter being advanceable from a starting position to a tapping position at the first end and retractable to the starting position, the cutter having a generally cylindrical cutter body threadingly engaged with an interior wall of the tapping portion,
    wherein one or more curved blades extend from the cutter body and define a cylindrical cutting void to retain a coupon cut from the water main,
    wherein the tapping portion has an open second end for operating the cutter, and
    wherein the cutter body forms a water-tight seal with the interior wall of the tapping portion when in the starting position.

2. The tapper of claim 1, further comprising a cap for covering the second end.
3. The tapper of claim 1, wherein the coupling portion is comprised of a branching portion connected to the tapping portion and a separate receiving portion coupled to the branching portion.
4. The tapper of claim 3, wherein the receiving portion is sized according to the service line to be received.
5. The tapper of claim 1, wherein the coupling portion comprises a restrainer for engaging the service line when received in the coupling portion.
6. The tapper of claim 1, wherein the second interior space is fluidly connected with the first interior space at a branching position, and wherein the starting position of the cutter is further from the first end than the branching position.
7. The tapper of claim 1, wherein the tapper includes a nut for coupling the tapping portion to the saddle, the nut being rotatably arranged on the tapping portion to permit the tapping portion to rotate with respect to the saddle.
8. A method for connecting a service line to a water main fitted with a saddle, the method comprising:
    coupling the tapper of claim 1 to the saddle;
    inserting the service line into the coupling portion;
    advancing the cutter arranged in the tapping portion until the tapping position such that an aperture is cut in the water main; and
    retracting the cutter to the starting position.
9. The method of claim 8, wherein inserting the service line into the coupling portion comprises inserting the service line at least until the restrainer arranged within the coupling portion engages the service line.
10. The method of claim 8, wherein the coupling portion comprises a separate receiving portion attachable to the branching portion, and wherein the method further comprises selecting a receiving portion sized for the service line and coupling it to the branching portion.
11. The method of claim 8, wherein advancing the cutter comprises advancing the cutter by screwing the cutter towards the water main.
12. The method of claim 8, wherein advancing and retracting the cutter comprises accessing the cutter from the second open end of the tapping portion.
13. The method of claim 12, further comprising capping the second open end.
14. The method of claim 8, further comprising rotating the tapping portion with respect to the saddle after coupling the tapper to the saddle.
15. The method of claim 8, further comprising advancing the cutter to shut off a flow of water to the service line.
16. The tapper of claim 1, wherein the cutter is configured to act as a valve to control the flow of water into the coupling portion.

* * * * *